United States Patent
Dijkstra (10) Patent No.: US 6,411,957 B1
(45) Date of Patent: Jun. 25, 2002

(54) SYSTEM AND METHOD OF ORGANIZING NODES WITHIN A TREE STRUCTURE

(75) Inventor: Wilco Dijkstra, Cherry Hinton (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 09/343,709

(22) Filed: Jun. 30, 1999

(51) Int. Cl.[7] .............................................. G06F 17/30
(52) U.S. Cl. ...................... 707/100; 707/101; 707/102; 707/104; 707/6
(58) Field of Search ................................ 707/103, 201, 707/3, 101, 8, 102, 4, 100, 104, 6

(56) References Cited

U.S. PATENT DOCUMENTS

| | | | | |
|---|---|---|---|---|
| 4,945,475 A | * | 7/1990 | Bruffey et al. ............... | 707/100 |
| 5,664,184 A | * | 9/1997 | Ferguson et al. ............ | 707/103 |
| 5,848,416 A | * | 12/1998 | Tikanen ........................ | 707/101 |
| 5,857,192 A | * | 1/1999 | Angle et al. ................. | 707/102 |
| 5,873,078 A | * | 2/1999 | Angle et al. ..................... | 707/3 |
| 5,956,705 A | * | 9/1999 | Stevens et al. .................. | 707/3 |
| 6,009,425 A | * | 12/1999 | Mohan ........................... | 707/8 |
| 6,138,123 A | * | 10/2000 | Rathbun ...................... | 707/201 |
| 6,181,678 B1 | * | 1/2001 | Ha-Duong et al. ......... | 370/235 |
| 6,185,570 B1 | * | 2/2001 | Ladwig et al. .............. | 707/102 |
| 6,223,174 B1 | * | 4/2001 | Ladwig et al. ................. | 707/4 |
| 6,233,574 B1 | * | 5/2001 | Ladwig .......................... | 707/4 |
| 6,334,123 B1 | * | 12/2001 | Ross et al. ..................... | 707/2 |

FOREIGN PATENT DOCUMENTS

EP 0878758 A * 11/1998 ............. G06F/7/24

OTHER PUBLICATIONS

Tom Chan, "Data Structures and Algorithms" Internet web page 1999, 13 pages.
Edward M. McCreight, "Priority Search Trees" *SIAM J. Comput* vol. 14, No. 2, May 1985, pp. 257–277.

* cited by examiner

*Primary Examiner*—Frantz Coby
(74) *Attorney, Agent, or Firm*—Nixon & Vanderhye P.C.

(57) ABSTRACT

A system and method are provided for organizing and managing a tree structure having a plurality of nodes representing physical entities, the tree structure defining a number of node locations, each node location being reached via a predetermined path from a root node of the tree structure. The method comprises the steps of associating first and second keys with each node to be included in the tree structure, the value of at least the first key being unique for each node, and then arranging the nodes within the tree structure by sorting the nodes with respect to both the first key and the second key, the sorting with respect to the first key being such that each node may be positioned within the tree structure at any node location along the path from the root node to the node location specified by the first key. By this approach, a search can be performed for a node within the tree structure based on specified criteria for both the first and second keys.

21 Claims, 6 Drawing Sheets

SYSTEM AND METHOD OF ORGANIZING NODES WITHIN A TREE STRUCTURE

BACKGROUND OF THE INVENTION

1. Field of the Invention

The present invention relates to a system and method of organizing nodes within a tree structure, and in particular to a system and method of organizing within a tree structure a plurality of nodes representing physical entities.

2. Description of the Prior Art

It is known to organize and manage a group of physical entities by representing those physical entities as a plurality of nodes within a tree structure, e.g. a binary tree structure. By creating such a tree structure to represent the physical entities, it is then possible to perform searches within the tree structure to find a particular physical entity, or a physical entity that meets some predetermined criteria. For example, the physical entities represented by the nodes of the tree structure may be blocks of memory and a search may be performed to find a particular block of memory, or a block of memory of a size greater than or equal to some predetermined threshold.

Each node within the tree structure will have a number of fields associated therewith. Typically, one field will be identified as a "key" and this key may be used to organize the nodes within the tree structure, so that the exact location of a particular node is dependent on that key. For example, considering the example where the physical entities may be blocks of memory, the key may be chosen to be the start address of each memory block, and the nodes within the tree may then be organized based on that address key, so that the nodes are sorted on increasing address.

It will be appreciated that by organizing the tree in such a way, it is then easy to perform searches based on the chosen key. However, it is often the case that a search may need to be performed based not only on a single parameter. However, since trees such as binary trees can generally only be sorted on a single key, the value of any other parameter required for searching will typically have to be provided within an auxiliary field associated with each node. The auxiliary field associated with a particular node may specify the value of a parameter which is not specific to that node itself, but also takes into account the value of that parameter as associated with all of its child nodes. For example, returning again to the example where the physical entities are blocks of memory, it may be desirable to perform a "first-fit" search, which aims to find the block of memory with the smallest address that has a size larger than or equal to a specified size. In such cases, each node would typically have an auxiliary field containing the maximum block size of itself and all of its children, and the nodes would be sorted within the tree by address key.

However, whilst this approach enables such searching to be performed, there is a significant amount of overhead in maintaining the auxiliary fields associated with each node. For example, to ensure predictable searching times, it is desirable for the trees to be balanced, i.e. for the tree to have a fixed maximum depth, and this requires that whenever a node is inserted or deleted, a rebalancing process is performed. Rebalancing is in itself a complicated procedure; for example even the relatively relaxed Red-Black trees require elaborate balancing steps (see "An Introduction to Algorithms" by Thomas Cormen, Charles Leiserson and Ronald Rivest, MIT Press, 1990, for a description of Red-Black trees). However, this process is further complicated when auxiliary fields are associated with each node, because in such cases the auxiliary fields will need to be recalculated for every node affected by the insertion or deletion. Further, it should be noted that since rebalancing progresses from the leaves towards the root, the tree must either be doubly linked, or a separate list with the path taken from the root must be made during the downward traversal.

It is an object of the present invention to provide an improved system and method for organizing a plurality of nodes within a tree structure.

SUMMARY OF THE INVENTION

Viewed from a first aspect, the present invention provides a method of organizing within a tree structure a plurality of nodes representing physical entities, the tree structure defining a number of node locations, each node location being reached via a predetermined path from a root node of the tree structure, the method comprising the steps of: (i) associating first and second keys with each node to be included in the tree structure, the value of at least the first key being unique for each node; (ii) arranging the nodes within the tree structure by sorting the nodes with respect to both the first key and the second key, the sorting with respect to the first key being such that each node may be positioned within the tree structure at any node location along the path from the root node to the node location specified by the first key; whereby a search can be performed for a node within the tree structure based on specified criteria for both the first and second keys.

In accordance with the present invention, each node has both first and second keys associated therewith, the value of at least the first key being unique for each node. Then, the nodes within the tree structure are sorted with respect to both the first key and the second key. In a typical prior art tree structure, such as a binary tree structure, this would not be possible, as the sorting with respect to the first key would preclude a further sorting with respect to any defined second key. However, in accordance with the present invention, the tree structure is defined such that the sorting with respect to the first key is such that each node may be positioned within the tree structure at any node location along the path from the root node to the node location specified by the first key. Hence, the exact placing of nodes based on the first key is less restricted than in the known prior art search trees, and this provides the flexibility to further sort the tree with respect to the second key. As a result, it is possible for a search to be performed for a node within the tree structure based on specified criteria for both the first and second keys.

It will be appreciated by those skilled in the art that the above defined tree structure may be used to represent a number of different types of physical entities. However, in preferred embodiments, the physical entities are free blocks of memory within a memory region, and the first key for each node is an address key identifying an address associated with the block of memory represented by that node.

Preferably, the address key identifies a start address for the block of memory.

In preferred embodiments, each node location has an address range associated with it such that a node positioned at that node location must represent a block of memory whose start address is within that address range, the root node location having the entire address range of the memory region associated with it. It will be appreciated that this approach enables any of the free blocks of memory to be allocated as the root node, since all of the free blocks of memory will fall within the address range associated with the root node location.

In preferred embodiments, the tree structure is a binary tree structure, and a number of the nodes are parent nodes, each parent node having at most two child nodes associated therewith, a first child node being positioned at a node location whose address range covers a first half of the parent node location's address range, and a second child node being positioned at a node location whose address range covers a second half of the parent node location's address range. Hence, considering the root node, which can represent any of the free blocks of memory, the only requirement for the two child nodes is that the first child node is in the bottom half of the address range of the memory region, whilst the second child node is in the upper half of the address range of the memory region. It should be noted that the choice of the two child nodes is hence independent of the actual block of memory represented by the root node, and in particular it is hence possible for both child nodes to have an address lower than the address of the root node, or for both child nodes to have an address higher than the address of the root node. This requirement is not specific to the root node and its children, but rather applies to the relationship between any parent node and its two child nodes. Because of this flexibility, it is then possible to provide further sorting based on a second key.

In preferred embodiments, the second key for each node is a size key identifying the size of the block of memory represented by that node, the nodes being sorted with respect to the second key at said step (ii) in order to give the tree structure a heap property, with the root node being the node representing the largest free block of memory.

The heap property is exhibited by the tree structure, since the root node contains the largest free block of memory, and the size of any parent is greater than the size of either of its children. Further, since the nodes are also ordered on address, as the tree is traversed in a first direction the nodes represent blocks with smaller addresses, whilst if the tree is traversed in the opposite direction, the nodes represent blocks with larger addresses.

Such an arrangement enables real-time performance of queries such as first-fit queries, whilst avoiding the drawbacks of having to provide auxiliary fields identifying block size information. In this context, "real-time" means that allocation of a memory block and freeing of a memory block take of the order log (N) time (often stated as O(log(N) time), where N is the number of free blocks of memory.

In preferred embodiments, a search can be performed within the binary tree structure to find the free block of memory having the smallest address whilst also having a size equal to or exceeding a specified size, the search comprising performing steps equivalent to executing the steps of: (a) initializing a best first-fit variable; (b) setting a current node to be the root node; (c) if the current node represents a block of memory smaller than the specified size, or if the current node is empty, outputting the best first-fit variable as the search result and terminating the process; (d) if the current node represents a block of memory equal to or larger than the specified size, and having an address lower than the node specified by the best first-fit variable, updating the best first-fit variable to identify the current node; (e) if a first child node is non-empty and represents a block of memory equal to or larger than the specified size, then setting the current node to be the first child node, otherwise setting the current node to be a second child node; (f) repeating steps (c) to (e) until the best first-fit variable is output.

Once the desired block of memory has been found, it will typically be allocated for the storage of data, and hence will need to be removed from the tree structure, since the tree only represents free blocks of memory that are available for allocation. Further, when the block of memory is no longer required for the storage of data, it will be freed, and will hence need to be inserted back into the tree structure.

In preferred embodiments, a new node is inserted in the binary tree structure by performing steps equivalent to executing the steps of: (a) setting a current node to be the root node; (b) if the current node is empty, inserting the new node and terminating the process; (c) if the new node has a size larger than the current node, swapping the new node with the current node, such that the new node to be inserted is the smaller node; (d) if the address of the new node is in a first half of an address range associated with the node location of the current node, setting a first child node of the current node to be the current node, or if the address of the new node is in a second half of an address range associated with the node location of the current node, setting a second child node of the current node to be the current node; (e) repeating steps (b) to (d) until the new node has been inserted.

Further, in preferred embodiments, a selected node is removed from the binary tree structure by performing steps equivalent to executing the steps of: (a) if the selected node has no valid child nodes associated with it, removing the reference to the selected node from its parent node, and terminating the process; (b) exchanging the node location of the selected node with the node location of the one of its child nodes that represents the larger block of memory; (c) repeating steps (a) and (b) until the selected node has been propagated to a node location where it has no valid child nodes, and accordingly is effectively removed at said step (a).

It will be appreciated that the above techniques allow insertion and deletion of nodes whilst preserving the ordering with respect to both the first and second key. Hence, the binary search tree will continue to have nodes sorted on address, and with sizes heap-ordered (and hence the tree can be considered to be horizontally sorted on address and vertically sorted on size, assuming an orientation where the root node is at the top, and the leaf nodes are at the bottom of the tree).

Although, as described above, the binary tree structure of preferred embodiments can be used to perform first-fit queries, it is also possible to perform other queries within the binary tree structure. For example, in preferred embodiments, a search for a particular node within the binary tree structure having a specified address key can be made by performing steps equivalent to executing the steps of: (a) setting a current node to be the root node; (b) if the current node is empty, indicating that the particular node has not been found, and terminating the process; (c) if the current node has an address key equal to the specified address key, returning the current node as the search result and terminating the process; (d) if the specified address key specifies an address in a first half of an address range associated with the node location of the current node, setting a first child node of the current node to be the current node, or if the specified address key specifies an address in a second half of the address range associated with the node location of the current node, setting a second child node of the current node to be the current node; (e) repeating steps (b) to (d) until the process is terminated.

In preferred embodiments, the tree structure is based on a radix-2 tree, a basic radix-2 tree being described in "The Art of Computer Programming; Sorting and Searching" by Knuth, published by Addison Wesly, (c) 1973, where such a tree is referred to as a digital search tree and described in §6.3 Digital Searching. A radix-2 tree is a binary tree where the left/right decision in tree level k is taken depending on bit k of the search key. Typically, radix-2 trees have been used in the prior art to sort nodes based on keys which do not have a finite size. For example, a radix-2 tree might be used to sort character strings. However, in accordance with the present invention, it was realized that if a radix-2 tree is used with a finite key, then the tree will automatically be balanced. This is because a radix-2 tree using D-bits keys will have a maximum depth of D and $2^D$ nodes, making radix-2 trees balanced by definition. Further, in accordance with the present invention, it has been found that radix-2 trees are able to be sorted with respect to a first key such that each node may be positioned within the radix-2 tree at any node location along the path from the root node to the node location specified by the first key, and that given this flexibility it is also then possible to order the nodes with respect to a second key. This allows radix-2 trees with fewer than $2^D$ actual nodes. The actual number of nodes N in the tree must satisfy $N=2^{(L \times D)}$ with the load factor L in (0, 1] for logarithmic performance (e.g. L=0.5 means the number of elements in the tree is $\sqrt{2^D}$, and the maximum depth D of the tree is twice the average depth L×D).

Viewed from a second aspect, the present invention provides a system for managing a tree structure having a plurality of nodes representing physical entities, the tree structure defining a number of node locations, each node location being reached via a predetermined path from a root node of the tree structure, the system comprising: (i) means for associating first and second keys with each node to be included in the tree structure, the value of at least the first key being unique for each node; (ii) a sorter for arranging the nodes within the tree structure by sorting the nodes with respect to both the first key and the second key, the sorting with respect to the first key being such that each node may be positioned within the tree structure at any node location along the path from the root node to the node location specified by the first key; whereby a search can be performed for a node within the tree structure based on specified criteria for both the first and second keys.

Viewed from a third aspect, the present invention provides a computer program product on a computer readable medium for creating and managing with a data processing system a tree structure having a plurality of nodes representing physical entities, the tree structure defining a number of node locations, each node location being reached via a predetermined path from a root node of the tree structure, the computer program product comprising: a key associater for associating first and second keys with each node to be included in the tree structure, the value of at least the first key being unique for each node; a sorter for arranging the nodes within the tree structure by sorting the nodes with respect to both the first key and the second key, the sorting with respect to the first key being such that each node may be positioned within the tree structure at any node location along the path from the root node to the node location specified by the first key; whereby a search can be performed for a node within the tree structure based on specified criteria for both the first and second keys.

Viewed from a fourth aspect, the present invention provides a method of providing a balanced binary tree structure having a plurality of nodes representing physical entities, the binary tree structure defining a number of node locations, each node location being reached via a predetermined path from a root node of the binary tree structure, the method comprising the steps of: (i) using a radix-2 tree for the binary tree structure; (ii) associating a first key with each node to be included in the binary tree structure, the value of the first key being unique for each node and being of a finite size; (iii) arranging the nodes within the binary tree structure by sorting the nodes with respect to the first key, whereby the radix-2 tree is automatically balanced.

As mentioned earlier, in accordance with the present invention, it has been realized that if the first key is chosen such that it is unique and of a finite size, then if the nodes are arranged within a radix-2 tree based on that key, the radix-2 tree will be automatically balanced, hence avoiding the requirement for complex rebalancing techniques to be applied each time a node is inserted or deleted.

In preferred embodiments, the sorting with respect to the first key at said step (iii) is such that each node may be positioned within the binary tree structure at any node location along the path from the root node to the node location specified by the first key, thereby facilitating the further sorting of the binary tree structure with respect to a second key.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

The preferred embodiment of the present invention will be discussed in the context of the allocation and deallocation of memory blocks represented by nodes in a binary tree structure.

Before discussing the binary tree structure of preferred embodiments, a description of how allocated blocks (hereafter referred to as AllocBlocks) and free blocks (hereafter referred to as FreeBlocks) are created and managed will first be provided.

A heap of memory (a heap being a region of memory divided into smaller blocks which can be allocated individually) to be managed by the tree structure of preferred embodiments is composed of AllocBlocks and Free-Blocks. These have the following structure.

An AllocBlock starts with a word describing its size; the rest is client-usable space. In preferred embodiments, the size of an AllocBlock is a multiple of four, and thus the low two bits of the size word are not needed for storing the block's size. Bit 0 of the size word is therefore set to 1 to indicate that the block is an AllocBlock. Bit 1 of the size word is set to 1 if and only if the AllocBlock is immediately preceded in memory by a FreeBlock.

A FreeBlock starts with two pointer words (used for organising all the FreeBlocks into the tree) and then a size word. The last word of a FreeBlock is also a size word. Thus, the minimum size of a FreeBlock is three words (in which case the two size words are in the same place).

Since a FreeBlock starts with a word-aligned pointer, bit 0 of the first word of a FreeBlock is clear. This enables AllocBlocks and FreeBlocks to be distinguished once their start address is known.

Every FreeBlock must be immediately followed in memory by an AllocBlock. Every AllocBlock which ever gets freed must be immediately followed by either an AllocBlock or a FreeBlock.

The required global state for the heap is a pointer to the root of the tree structure.

The high-level heap management routines are as follows.

To initialise the heap, an empty tree is created (i.e. the root pointer is set to NULL).

To bring a region of memory under control of the heap (done at initialisation time, and potentially again if a user heap extension function is called), the last word of the region is made into a trivial AllocBlock, which can never be freed, since it is not followed by anything meaningful. The rest of the memory region is made into a large FreeBlock, which is followed directly by an AllocBlock as required. Then, the FreeBlock is added into the tree structure by an "insert-node" operation to be described later.

To allocate N bytes from the heap, N is rounded up to a 4-byte boundary, and the 4-byte overhead is added in an AllocBlock, to determine the size of FreeBlock actually needed. It may also be determined to round up to a minimum allocated block size. Then, a block of at least this size is found in the tree structure using a "first-fit-find" operation to be described later. If none can be found, the allocation fails (preferably, a heap extension function is called and then the allocation processed is tried again). Assuming a block is found, it is removed from the tree using a "remove-node" operation to be described later.

Then, it is determined how much larger the block is than it needs to be, and it is decided whether it is worth splitting the block or just using it all. Assuming the block is not to be split, the FreeBlock is turned into an AllocBlock and bit 1 of the following AllocBlock is adjusted. If the block is being split, the FreeBlock is turned into an AllocBlock followed by a FreeBlock. Bit 1 of the AllocBlock should be zero, since if the FreeBlock were directly preceded by another FreeBlock then the latter block would be directly followed by the former, violating the rules. The new FreeBlock is then inserted back into the tree using the insert-node operation. A new AllocBlock now exists whose client space is at least N bytes long.

To free an AllocBlock back to the heap, the following process is performed. If bit 1 of the AllocBlock is set, the block is directly preceded by a FreeBlock, which must therefore be merged with this block. Thus, that FreeBlock is removed from the tree structure using the remove-node operation, and a new FreeBlock is constructed covering the space of both blocks. If bit 1 of the AllocBlock was not set, the AllocBlock is turned into a FreeBlock of the same size.

If the new FreeBlock is followed by another FreeBlock, it must be merged with that one as well (by removing it from the tree, and constructing a new FreeBlock covering all the space). Now the new FreeBlock must be followed by an AllocBlock, since either it was to start with, or it was just merged with one which was. So, the new FreeBlock is added to the tree using the insert-node operation.

Figure 1A:
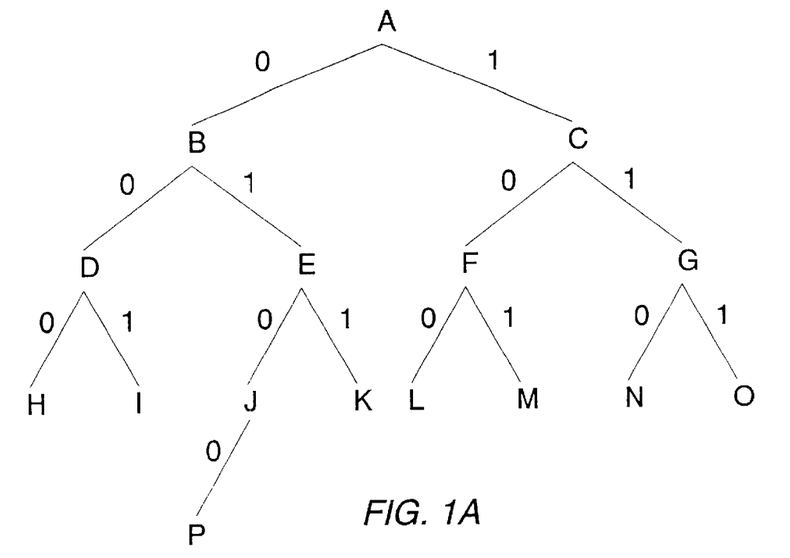
FIGS. 1A and 1B illustrate a binary tree structure organized in accordance with preferred embodiments of the present invention.
Figure 1B:
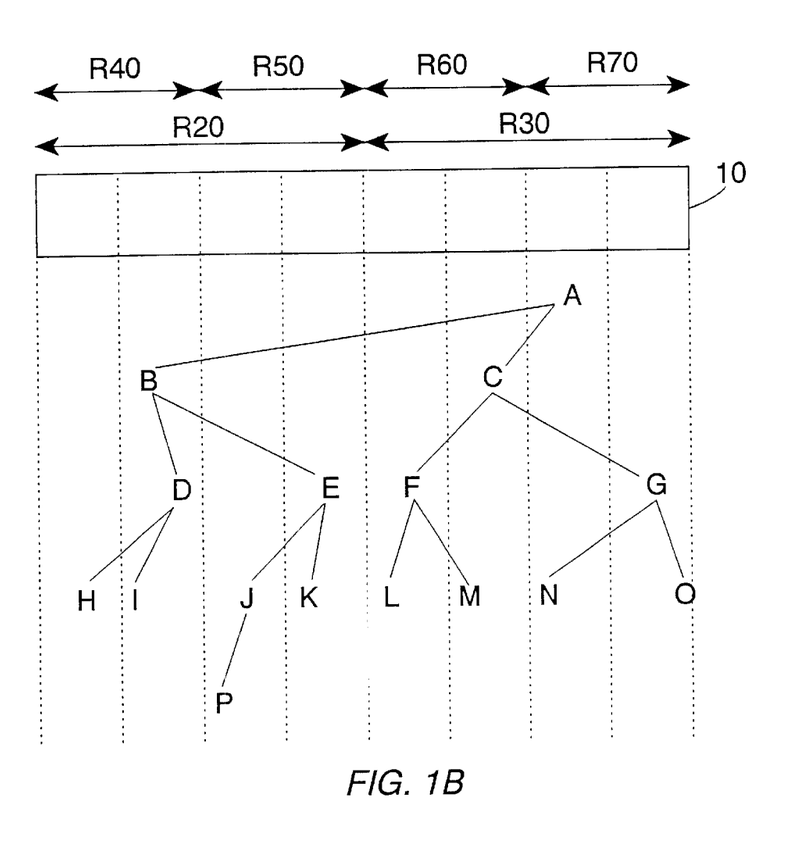

The binary tree structure used in accordance with preferred embodiments of the present invention to represent FreeBlocks of memory is illustrated in FIGS. 1A and 1B. In accordance with preferred embodiments, the binary tree structure is based on a radix-2 tree, and as mentioned earlier, a radix-2 tree using D-bits keys has a maximum depth of D and $2^D$ nodes, making radix-2 trees balanced by definition. In the example of FIG. 1A, the tree is shown as having node locations A to P, the tree being fully populated when a node is located at each of these node locations. As will be appreciated, this tree obeys the radix-2 tree property set out above, since using a 4-bit key, the tree has a maximum depth of 4, and a maximum number of 16 ($2^4$) nodes.

In accordance with preferred embodiments, a node specified by a particular first key may be positioned at any node location along the path from the root node location to the node location specified by the first key. Hence, if the first key is 0100, it will be seen from FIG. 1A that that node could be positioned at the node location P, since that is the node location reached by using the entire first key. However, in accordance with preferred embodiments of the present invention, it is also possible for that node to be located at one of the node locations A, B, E or J instead of being located at node location P. As will be discussed in more detail below, this still enables an address ordering to be maintained, whilst also facilitating ordering based on a second key, such as block size. In particular, it will be appreciated that if the block specified by address key 0100 is actually the largest FreeBlock, it can be placed at node location A, thereby enabling the tree structure to exhibit a heap property, whilst still maintaining the address ordering.

The address ordering will be discussed further with reference to FIG. 1B. As shown in FIG. 1B, a memory region 10 is allocatable to the tree. In preferred embodiments, every node is considered to have a left child, a right child, and a size. The left child and/or the right child may be specified as "null" if the respective child node is empty. Further, each node location has associated therewith a range of address space, which need not be explicitly stored, since it can be deduced based on the position within the tree. It is required that the start address of a node placed at a particular node location must fall within the address space associated with that node location. The root node location of the tree, i.e. node location A, covers the entire address space controllable by the tree, i.e. the entire address space of the memory region 10. Accordingly, any FreeBlock of memory may be represented by the root node.

For any particular node X, the left child of X must be positioned at a node location whose address range covers a first half of the parent node location's address range, whilst the right child of X must be positioned at a node location whose address range covers a second half of the parent node location's address range. Hence, with reference to FIG. 1B, the left child of the root node will be positioned at node location B having address range R20, whilst the right child will be stored at node location C having address range R30.

FIG. 1B illustrates an example of a fully populated tree, where the start address of the actual nodes placed at node locations A to P are indicated by the relative positions of node locations A to P with respect to the memory region 10. As can be seen from FIG. 1B, it is perfectly possible that both children for a particular parent node may have lower start addresses than the parent node itself, see for example the location of the child nodes B and C with respect to the parent node A. Similarly, both child nodes may have addresses larger than the start address of the parent node, see for example the location of child nodes D and E with respect to parent node B.

The above property of the child nodes with respect to the parent node is propagated all the way through the tree. Hence, whilst node location B covers the address range R20, the child nodes for the node placed at node location B will be placed at node location D covering address range R40 and node location E covering address range R50, i.e. the left child can have an address anywhere within the lower half of the address range of the parent, whilst the other child can have an address anywhere within the upper half of the address range of the parent. It will be appreciated that this approach allows address ordering to be achieved, whilst also providing enough flexibility to allow ordering with respect to size in order to enable the tree to adopt the heap property. Accordingly, this ensures that no node is smaller than either of its children. Hence, two properties emerge concerning any portion of the tree consisting of a node X and all of its descendants, namely:

1. X is the largest node in the sub-tree (heap property) and
2. Any node within the entire tree will only have a start address within the address range of X's node location if and only if it is in the sub-tree consisting of node X and all of its descendants (ordering property).

Further, another important property which emerges is that of maximum depth. Every node in the tree can be reached in at most log (address-space-size) steps from the root, because after that many steps the address range covered will have reduced to one byte and therefore there can be at most one node in the resulting sub-tree.

It has been found that such a binary tree structure enables a real-time "heap" to be provided, a heap being a region of memory divided into smaller blocks which can be allocated and freed individually.

Having described the tree structure in accordance with preferred embodiments of the present invention, the operations performed on that tree in accordance with preferred embodiments will now be described in detail with reference to FIGS. 2 to 6.

Figure 2:
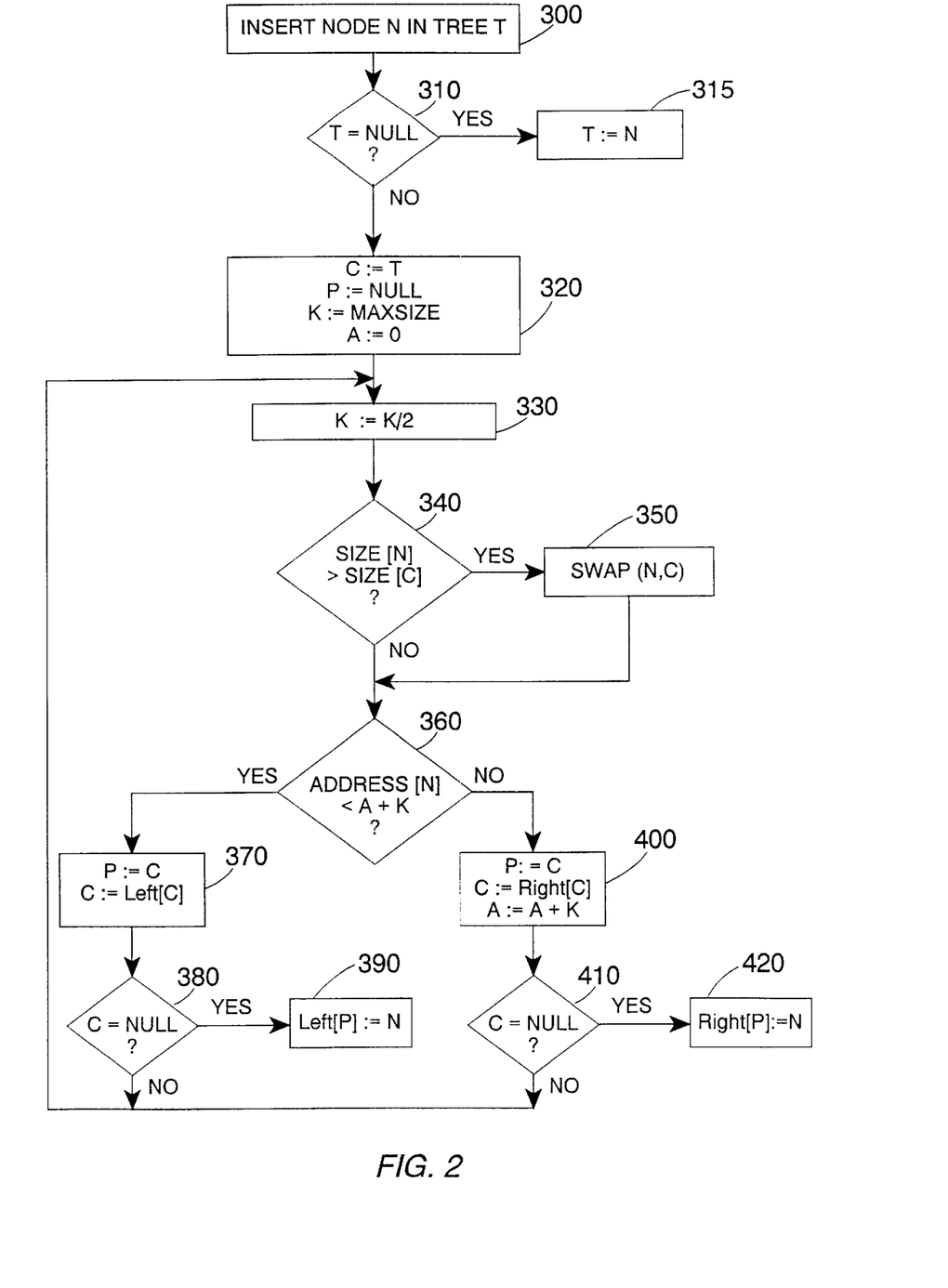
FIG. 2 illustrates the process involved in inserting a node into the binary tree structure of preferred embodiments of the present invention.

FIG. 2 illustrates the process performed in order to insert a node N in a tree T, where T is the root node used to identify the tree. Firstly, at step 310, it is determined whether the root node is empty, in which case the process proceeds to step 315, where the node N is inserted as the root node T.

However, assuming the root node is determined not to be empty at step 310, then the process proceeds to step 320 where a number of attributes are set. Firstly, a current node C is set to be the root node T. Further, a parameter P identifying the previous node is set equal to null, a parameter K is set equal to the maximum size of the memory region controlled by the tree, and a trial address A is set equal to zero.

The process then proceeds to step 330, where the value of K is divided by two. Then, at step 340, it is determined whether the size of the node N is greater than the size of the current node C. If it is, then the process proceeds to step 350 where the node N and the current node C are swapped, such that the smaller node is the one that remains to be inserted, this smaller node being identified as node N. The process then proceeds to step 360, or proceeds directly from step 340 to 360 if the node to be inserted is not greater in size than the current node C.

At step 360, it is determined whether the address of node N is less than A+K, and hence on the first iteration determines whether the address is in the lower half of the entire address range. If it is, then the process proceeds to step 370, where the parameter P is set equal to the current node C, and the current node C is then updated to be equal to the left child of C. Next, at step 380 it is determined whether the current node is empty. If it is, then the left child node of P is set to be the node N, and the process then terminates.

If at step 360, it was determined that the address of node N was not less than A+K, then the process proceeds to step 400, where again the parameter P is set to be the current node C, and in this instance the current node C is updated to be the right child of C. Further, the trial address A is set equal to A+K. Then, at step 410, it is determined whether the current node C is empty, and if so the right child of P is set to be the node N at step 420. The process then terminates.

Assuming that at either step 380 or at step 410 it is determined that the current node is not empty, then the process returns to step 330, where the process is repeated until the node N has been inserted.

From the above process, it will be appreciated that during any iteration of the process, the node that is to be inserted is within the address range of the current node that is being studied. Hence, if the nodes are exchanged at step 350, this cannot change, since both nodes must be within the address range corresponding to the node location in the tree of the current node being studied. Moving down the tree to update the current node to be one of its children also does not destroy the fact that the node to be inserted is within the address range of the current node being studied, since that is the basis by which it is decided which of the two children to move to. Therefore, it is clear that the ordering property is maintained throughout the insertion process.

Therefore, after log(address-space-size) steps, the address range of the current node being looked at must have reduced to one byte, and therefore the only node which can possibly go in that range is the node to be inserted. Therefore at that stage, the current node must be a null node, and the algorithm must terminate after inserting the node N.

Further, it will be appreciated that the heap property is maintained at every step of the insertion process by checking whether the largest node in the sub-tree will change as a result of inserting the new node (see step 340).

The process for performing a first-fit query within the tree structure of preferred embodiments will now be discussed with reference to FIG. 3. Firstly, at step 510, it is determined whether the root node T is empty, and if so a null value is returned at step 520, indicating that no suitable block can be found. However, assuming that the root node is not empty, then it is determined at step 530 whether the size of the root node T is smaller than the desired size S. If it is, then the process proceeds to step 540, where again a null value is returned to indicate that no suitable block can be found.

However assuming that the size of the root node T is greater than the required size, then the process proceeds to step 550, where the best-node-so-far parameter B is set equal to the root node T, the current node C also being set equal to the root node T.

The process then proceeds to step 560, where it is determined whether the left child of C is empty if not. Assuming it is not empty, then it is determined at step 570 whether the size of the left child is greater than the required size S. If it is, then the current node C is updated to be equal to the left child of C at step 575.

If either the left child of C is determined to be empty at 560, or the size of the left child is determined to be less than the required size S at step 570, then in both instances the process branches to step 580, where it is determined whether the right child of C is empty. If it is, then this means that there are no further nodes in the tree that would suite the first fit criteria, and accordingly the process proceeds to step 590 where the current value of B is returned as the first fit node.

If the right child of C is determined not to be empty, then the process proceeds from step 580 to step 600, where it is determined whether the size of the right child is greater than the desired size S. If it is not, then again this means that there are no further nodes in the tree that would meet the first fit criteria, and accordingly at step 610 the current value of B is output as the first fit node.

However, assuming that the size of the right child is greater than the desired size S, then the process proceeds to step 620, where C is updated to be equal to the right child of C.

If at either step 575 or at step 620, the current node C is updated to be either the left or right child of C, then the process proceeds to step 630, where it is determined whether the address of the now updated value of C is less than the address of the node indicated by the parameter B. If it is, then this means that the current node C better meets the first fit criteria than the node indicated by the parameter B, and accordingly the parameter B is updated to be equal to the current node C at step 640. The process then returns to step 560. Further, if at step 630, it is determined that the address of C is not less than the address of B, then there is no update required to the parameter B, and the process returns directly to step 560.

Figure 3:
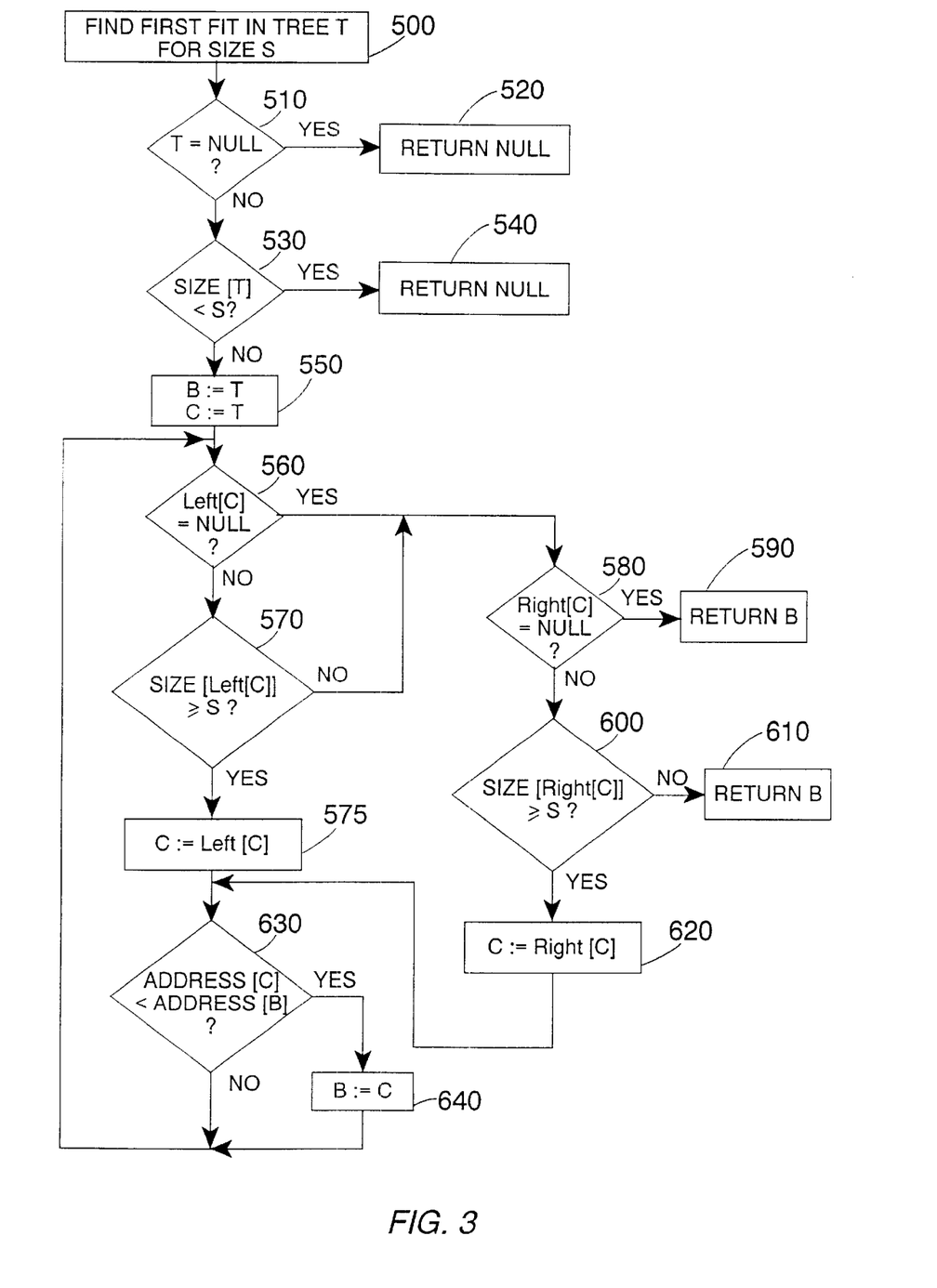
FIG. 3 illustrates the process involved in performing a first-fit query within the tree structure of preferred embodiments of the present invention.

As will be appreciated from the above description of FIG. 3, throughout the entirety of the process, the first fit node is either the one in the best-node-so-far parameter B, or somewhere in the sub-tree starting at the current node C being studied. The algorithm terminates when the sub-tree starting at the current node C contains no nodes big enough, and therefore the node in the parameter B must be the one that best meets the first fit criteria. Also, since the process moves one level down the tree in each step, it is clear that the algorithm will terminate within log (address-space-size) steps.

Further, with reference to FIG. 3, it is clear that wherever possible, the process tries to branch to the left child, as the left child will have a lower address than the right child at any particular level. It is clear that by adopting this practice, the process will always produce the first fit node, assuming such a node exists. To prove that the FIG. 3 process works, if the case where a current node C is being studied is considered, then it is clear that the first fit node must either be referenced by the parameter B, or be the current node C that is being studied, or be in the left sub-tree, or be in the right sub-tree. If the first fit node is referenced by the parameter B, there exists no better node anywhere else in the tree, and so the parameter B will remain unchanged throughout the process. If, in contrast, the current node C is actually the first fit node, then it is clear that the parameter B will be updated at step 640, and so again the first fit node will ultimately be output.

If however the first fit node is in the left sub-tree, then it is clear that the left child of the current node being studied will be of at least the required size, and so the algorithm would move to the left sub-tree at step 570. This will ensure that at some point the first fit node is found and the parameter B updated accordingly. If, however, the first fit node is in the right sub-tree, then by definition there can be no node of suitable size in the left sub-tree and in particular the left child will be too small and the algorithm will move to the right sub-tree at step 570, thereby ensuring that the first fit node is located and the parameter B updated accordingly.

Figure 4:
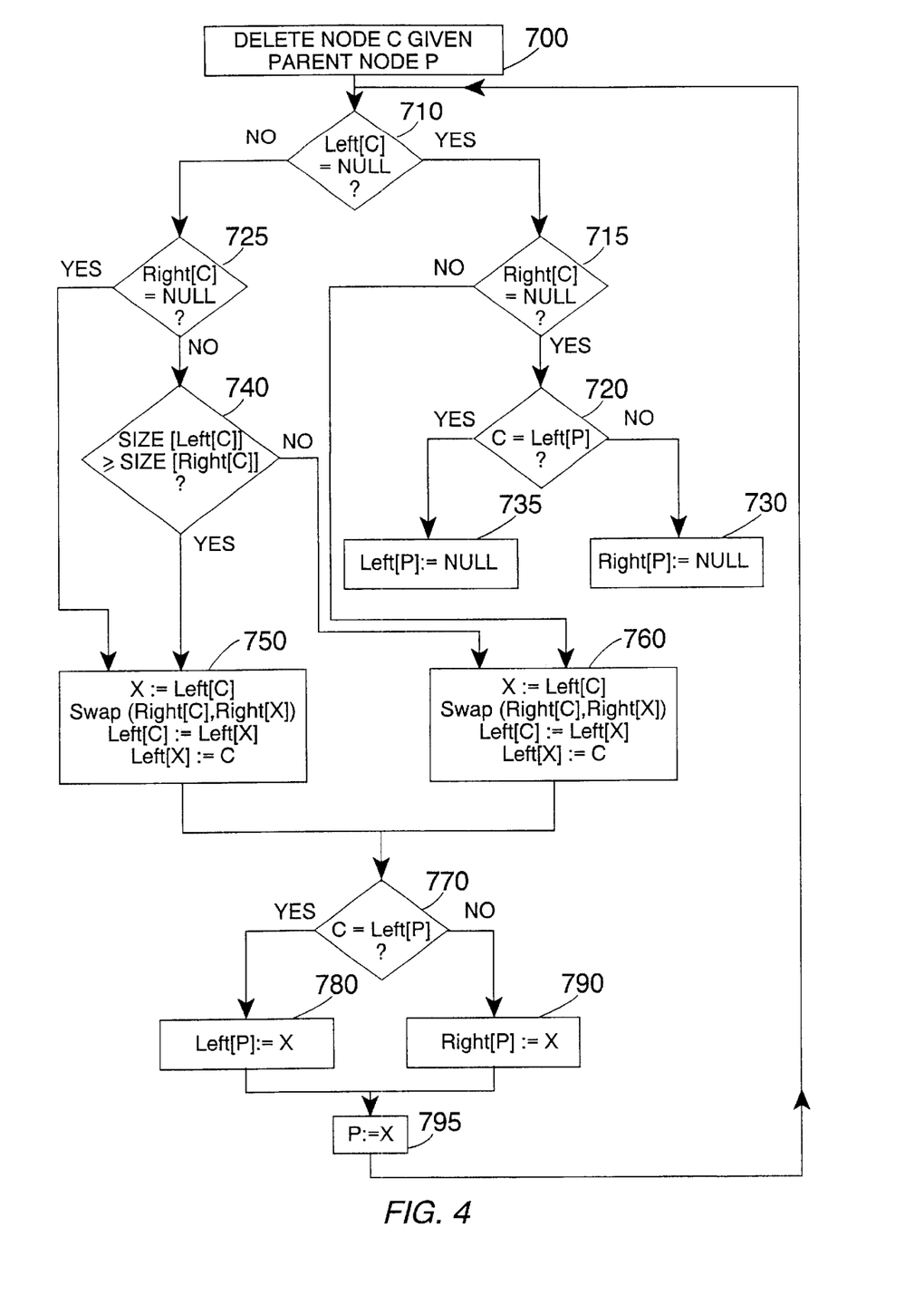
FIG. 4 illustrates how a node is deleted from the tree structure in accordance with preferred embodiments of the present invention.

Once a particular node has been found, whether by a first fit query such as that described with reference to FIG. 3, or by a search for a specific block of memory, then assuming that the memory block represented by that node is to be allocated, that node must be removed from the tree. FIG. 4 describes a process for deleting a node C given its parent node P. In preferred embodiments, each node has a record of its parent node, and so node P is readily derivable given node C.

Firstly, at step 710, it is determined if the left child of C is empty, and if it is, it is then determined at step 715 whether the right child of C is empty. If both children are empty, the process proceeds to step 720 where it is determined whether the node C is the left child of P. If it isn't, then by deduction it must be the right child of P, and in this instance the right child of P is set to zero at step 730, thereby effectively deleting node C. If C is the left child of P, then the left child of P is set to zero at step 735, again effectively deleting the node C. The simple deletion performed at either step 730 or step 735 is all that is required, since it had been determined earlier at steps 710 and 715 that there were no children of C to take into account.

However, if at step 710 it is determined that the left child of C is not empty, the process proceeds to step 725, where it is determined if the right child is empty. If the right child is empty, the process proceeds directly to step 750, whereas otherwise the process proceeds to step 740 where it is determined whether the size of the left child of C is greater than the size of the right child of C. If it is, then the process proceeds to step 750, otherwise the process proceeds to step 760. Referring back to step 715 if it is determined that the right child of C is not empty, then the process proceeds directly to step 760.

The purpose of step 750 is to perform a swap procedure to ripple node C down a level, so that it becomes a child of what was previously its own left child, hereafter referred to as node X. In a similar fashion, the purpose of step 760 is to perform a swap procedure to ripple the node C down the tree, so that is effectively becomes a child of what was previously its own right child, also referred to hereafter as node X.

The swap procedure of step 750 will now be discussed. Firstly, the parameter X is set equal to the left child of C. Then the right child of C and the right child of X are swapped. Then the left child of C is set to be equal to the left child of X, and finally the left child of X is set equal to C. For the swap procedure of step 760, the following steps are performed. Firstly, the parameter X is set equal to the right child of C. Then the left child of C and the left child of X are swapped, and then the right child of C is set equal to the right child of X. Finally, the right child of X is set equal to C.

Irrespective of whether step 750 or step 760 is performed, the process proceeds to step 770, where it is determined whether C is the left child of P. If it is, then the left child of P is set to be X at step 780, whereas otherwise C must be the right child of P, and at step 790 the right child of P is set to be X. Finally at step 795, the value of P is updated to be X, and then the process returns to step 710.

Since the node C to be deleted is rippled down the tree during each iteration of the process, it will be clear that at some point the node to be deleted will have no children, and the process will branch to step 720, causing the node to be effectively deleted at either step 730 or step 735.

To prove that the deletion process illustrated with reference to FIG. 4 is correct, consider that the node C to be deleted is of effectively zero size. Further, consider it also to be at no location, i.e. its presence in a sub-tree is not considered to violate the ordering property on that sub-tree. With these assumptions, then invariants during the algorithm are that the ordering property is maintained everywhere, and the heap property is maintained everywhere except the sub-tree starting at the zero-size node C.

Each step of the algorithm restores the heap property at the node being studied, by exchanging the zero-size node with the larger of its children. Moving a node up to the place of its parent cannot violate the ordering property anywhere.

Eventually, the bottom of the tree is reached, in at most log (address-space-size) steps, and the node to be removed is the only blemish in the tree's properties anywhere. However, at this point the node C is deleted, and hence it is clear that the tree's properties are maintained.

Figure 5:
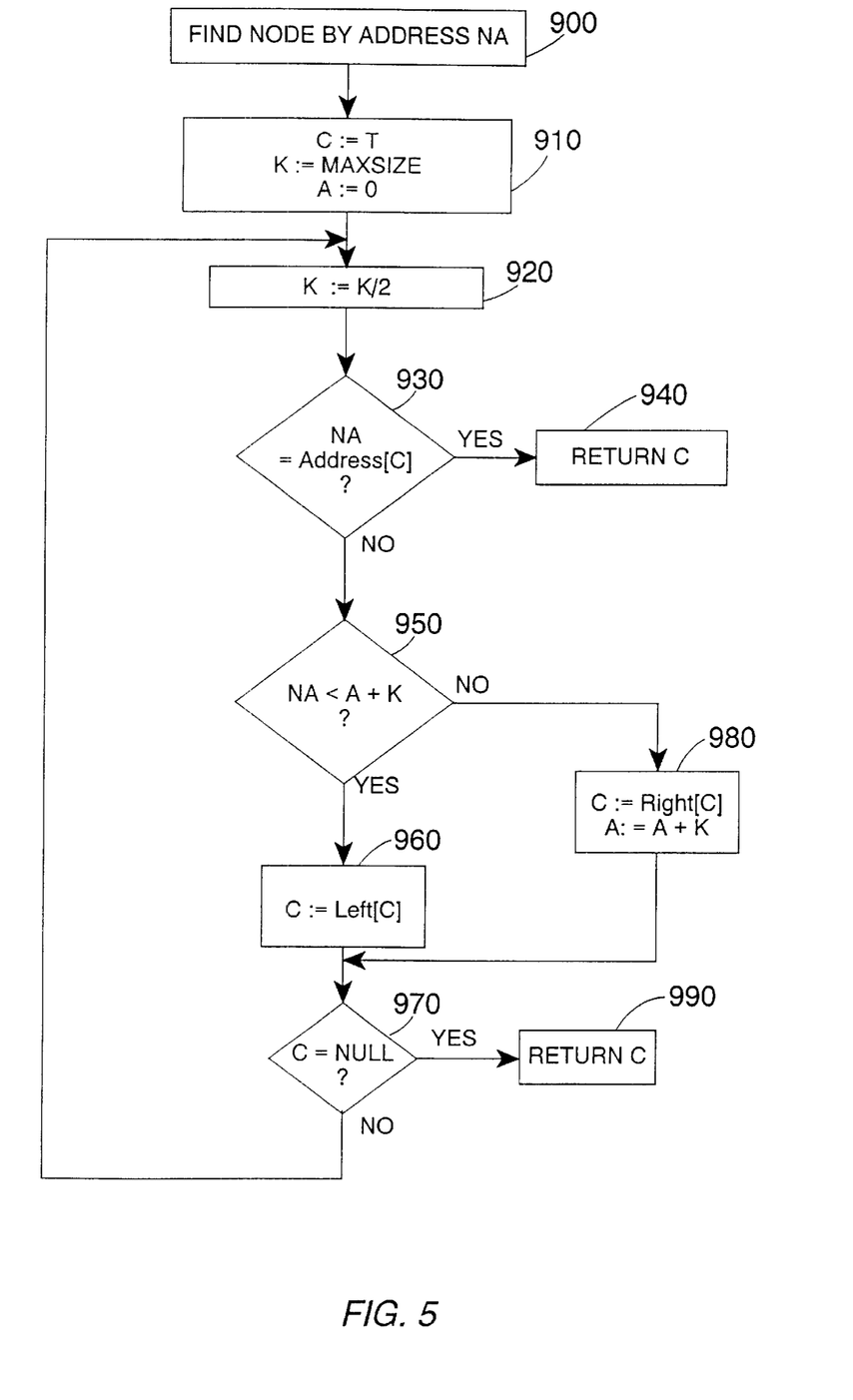
FIG. 5 illustrates the process involved when locating a particular node within the tree structure of preferred embodiments of the present invention based on the address.

It will be appreciated that there are other types of searching which may be performed within the tree of preferred embodiments, rather than just first fit searches. FIG. 5 illustrates an example, whereby a node is located by its address key. Firstly, at step 910, the current node C is set equal to the root node T, a parameter K is set equal to the maximum size of the memory region, and a trial address A is set equal to zero. Then, at step 920, the value of K is divided by two, and at step 930 it is determined whether the node address NA for the node to be located is equal to the address of the current node C. If it is, then at step 940 the node C is returned as the node being requested.

Otherwise, the process proceeds to step 950, where it is determined whether the node address NA is less than A+K, i.e. during the first iteration whether the address NA is in the bottom half of the complete address range. If it is, then the process proceeds to step 960, where the current node C is updated to be equal to the left child of C. However, if at step 950 it is determined that the value of NA is not less than A+K, then the process proceeds to step 980, where the current node C is updated to be equal to the right child of C, and the value of A is set equal to A+K.

The process then proceeds to step 970, where it is determined whether the current node is empty, if it is the process branching to step 990 where the value of C is returned, this in effect returning a zero value and indicating that the node cannot be found. However, assuming that the current node C is not empty, then the process returns to step 920. If the node is within the tree, then at some point it will be returned at step 940. Otherwise, at some point the current node C will be empty, and the process will terminate at step 990.

Figure 6:
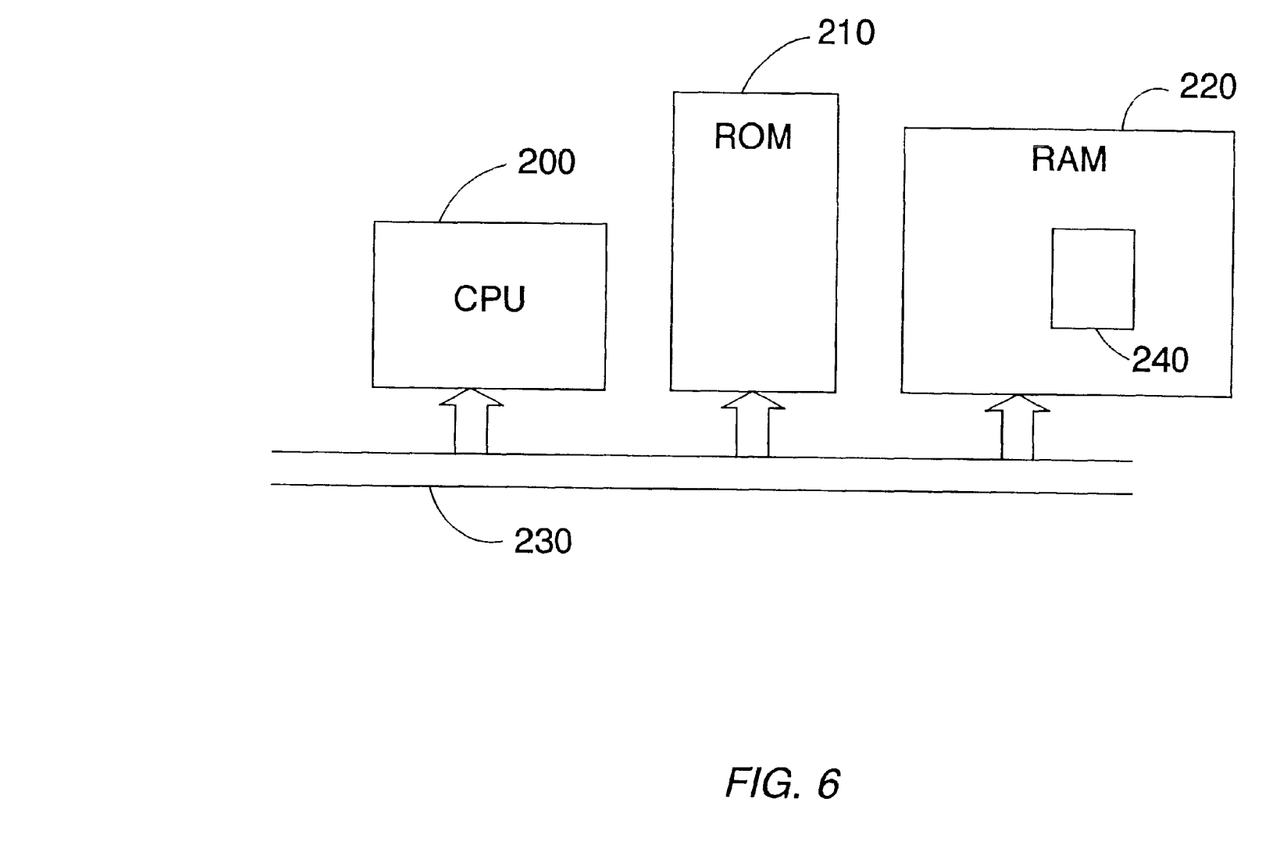
FIG. 6 illustrates a general purpose data processing system for performing the techniques described in relation to FIGS. 1 to 6.

FIG. 6 illustrates a typical data processing system that may be used to implement the techniques described above. A common bus 230 links a central processing unit 200, a random access memory 220 and a read only memory 210.

In operation, software stored within the read only memory 210 or random access memory 220 may be executed by the central processing unit 200 to carry out the techniques described above. The tree structure 240 would typically be maintained in the RAM 220. The system illustrated in FIG. 6 operates to perform the role of the various logic elements previously described.

The techniques of preferred embodiments of the present invention allow a real time memory heap manager to be provided which is also small in code size and efficient.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A method of organizing within a tree structure a plurality of nodes representing physical entities, the tree structure defining a number of node locations, each node location being reached via a predetermined path from a root node of the tree structure, the method comprising the steps of:

(i) associating first and second keys with each node to be included in the tree structure, the value of at least the first key being unique for each node;

(ii) arranging the nodes within the tree structure by sorting the nodes with respect to both the first key and the second key, the sorting with respect to the first key being such that each node may be positioned within the tree structure at any node location along the path from the root node to the node location specified by the first key;

whereby a search can be performed for a node within the tree structure based on specified criteria for both the first and second keys.

2. A method as claimed in claim 1, wherein the physical entities are free blocks of memory within a memory region, and the first key for each node is an address key identifying an address associated with the block of memory represented by that node.

3. A method as claimed in claim 2, wherein the address key identifies a start address for the block of memory.

4. A method as claimed in claim 3, wherein each node location has an address range associated with it such that a node positioned at that node location must represent a block of memory whose start address is within that address range, the root node location having the entire address range of the memory region associated with it.

5. A method as claimed in claim 4, wherein the tree structure is a binary tree structure, and a number of the nodes are parent nodes, each parent node having two child nodes associated therewith, a first child node being positioned at a node location whose address range covers a first half of the parent node location's address range, and a second child node being positioned at a node location whose address range covers a second half of the parent node location's address range.

6. A method as claimed in claim 2, wherein the second key for each node is a size key identifying the size of the block of memory represented by that node, the nodes being sorted with respect to the second key at said step (ii) in order to give the tree structure a heap property, with the root node being the node representing the largest free block of memory.

7. A method as claimed in claim 6, wherein the tree structure is a binary tree structure, and wherein a search is performed within the binary tree structure to find the free block of memory having the smallest address whilst also having a size equal to or exceeding a specified size, the search comprising performing steps equivalent to executing the steps of:

(a) initializing a best first-fit variable;

(b) setting a current node to be the root node;

(c) if the current node represents a block of memory smaller than the specified size, or if the current node is empty, outputting the best first-fit variable as the search result and terminating the process;

(d) if the current node represents a block of memory equal to or larger than the specified size, and having an address lower than the node specified by the best first-fit variable, updating the best first-fit variable to identify the current node;

(e) if a first child node is non-empty and represents a block of memory equal to or larger than the specified size, then setting the current node to be the first child node, otherwise setting the current node to be a second child node;

(f) repeating steps (c) to (e) until the best-fit variable is output.

8. A method as claimed in claim 6, wherein the tree structure is a binary tree structure, and wherein a new node is inserted in the binary tree structure by performing steps equivalent to executing the steps of:

(a) setting a current node to be the root node;

(b) if the current node is empty, inserting the new node and terminating the process;

(c) if the new node has a size larger than the current node, swapping the new node with the current node, such that the new node to be inserted is the smaller node;

(d) if the address of the new node is in a first half of an address range associated with the node location of the current node, setting a first child node of the current node to be the current node, or if the address of the new node is in a second half of an address range associated with the node location of the current node, setting a second child node of the current node to be the current node;

(e) repeating steps (b) to (d) until the new node has been inserted.

9. A method as claimed in claim 6, wherein the tree structure is a binary tree structure, and wherein a selected node is removed from the binary tree structure by performing steps equivalent to executing the steps of:

(a) if the selected node has no valid child nodes associated with it, removing the reference to the selected node from its parent node, and terminating the process;

(b) exchanging the node location of the selected node with the node location of the one of its child nodes that represents the larger block of memory;

(c) repeating steps (a) and (b) until the selected node has been propagated to a node location where it has no valid child nodes, and accordingly is effectively removed at said step (a).

10. A method as claimed in claim 6, wherein the tree structure is a binary tree structure, and wherein a search for a particular node within the binary tree structure having a specified address key is made by performing steps equivalent to executing the steps of:

(a) setting a current node to be the root node;

(b) if the current node is empty, indicating that the particular node has not been found, and terminating the process;

(c) if the current node has an address key equal to the specified address key, returning the current node as the search result and terminating the process;

(d) if the specified address key specifies an address in a first half of an address range associated with the node location of the current node, setting a first child node of the current node to be the current node, or if the specified address key specifies an address in a second half of the address range associated with the node location of the current node, setting a second child node of the current node to be the current node;

(e) repeating steps (b) to (d) until the process is terminated.

11. A method as claimed in claim 1, wherein the tree structure is based on a radix-2 tree.

12. A system for managing a tree structure having a plurality of nodes representing physical entities, the tree structure defining a number of node locations, each node location being reached via a predetermined path from a root node of the tree structure, the system comprising:

(i) means for associating first and second keys with each node to be included in the tree structure, the value of at least the first key being unique for each node;

(ii) a sorter for arranging the nodes within the tree structure by sorting the nodes with respect to both the first key and the second key, the sorting with respect to the first key being such that each node may be positioned within the tree structure at any node location along the path from the root node to the node location specified by the first key;

whereby a search can be performed for a node within the tree structure based on specified criteria for both the first and second keys.

13. A system as claimed in claim 12, wherein the physical entities are free blocks of memory within a memory region, and the first key for each node is an address key identifying an address associated with the block of memory represented by that node.

14. A system as claimed in claim 13, wherein the address key identifies a start address for the block of memory.

15. A system as claimed in claim 14, wherein each node location has an address range associated with it such that a node positioned at that node location must represent a block of memory whose start address is within that address range, the root node location having the entire address range of the memory region associated with it.

16. A system as claimed in claim 15, wherein the tree structure is a binary tree structure, and a number of the nodes are parent nodes, each parent node having two child nodes associated therewith, a first child node being positioned at a node location whose address range covers a first half of the parent node location's address range, and a second child node being positioned at a node location whose address range covers a second half of the parent node location's address range.

17. A system as claimed in claim 13, wherein the second key for each node is a size key identifying the size of the block of memory represented by that node, the nodes being sorted with respect to the second key by the sorter in order to give the tree structure a heap property, with the root node being the node representing the largest free block of memory.

18. A system as claimed in claim 12 wherein the tree structure is based on a radix-2 tree.

19. A computer program product on a computer readable medium for creating and managing with a data processing system a tree structure having a plurality of nodes representing physical entities, the tree structure defining a number of node locations, each node location being reached via a predetermined path from a root node of the tree structure, the computer program product comprising:

a key associater for associating first and second keys with each node to be included in the tree structure, the value of at least the first key being unique for each node;

a sorter for arranging the nodes within the tree structure by sorting the nodes with respect to both the first key and the second key, the sorting with respect to the first key being such that each node may be positioned within the tree structure at any node location along the path from the root node to the node location specified by the first key;

whereby a search can be performed for a node within the tree structure based on specified criteria for both the first and second keys.

20. A method of providing a balanced binary tree structure having a plurality of nodes representing physical entities, the binary tree structure defining a number of node locations, each node location being reached via a predetermined path from a root node of the binary tree structure, the method comprising the steps of:

(i) using a radix-2 tree for the binary tree structure;

(ii) associating a first key with each node to be included in the binary tree structure, the value of the first key being unique for each node and being of a finite size;

(iii) arranging the nodes within the binary tree structure by sorting the nodes with respect to the first key, whereby the radix-2 tree is automatically balanced.

21. A method as claimed in claim 20, wherein the sorting with respect to the first key at said step (iii) is such that each node may be positioned within the binary tree structure at any node location along the path from the root node to the node location specified by the first key, thereby facilitating the further sorting of the binary tree structure with respect to a second key.

* * * * *